United States Patent
Ulrich et al.

[15] 3,685,591
[45] Aug. 22, 1972

[54] SLIT TRENCHING AND CABLE LAYING MACHINE WITH ORBITAL ACTION PLOW

[72] Inventors: Raymond M. Ulrich; Solomon D. Ulrich, both of c/o Ulrich Foundation, Inc, Roanoke, Ill. 61561

[22] Filed: Oct. 24, 1969

[21] Appl. No.: 869,248

Related U.S. Application Data

[63] Continuation-in-part of Ser. No. 616,585, Feb. 16, 1967, abandoned.

[52] U.S. Cl.................172/40, 37/193, 37/DIG. 18, 61/72.6, 173/49
[51] Int. Cl..............................F16l 1/00, E02f 5/02
[58] Field of Search................172/40, 421; 37/193, 98, DIG. 18; 61/72.6; 299/14; 173/49

[56] References Cited

UNITED STATES PATENTS

| | | | |
|---|---|---|---|
| 1,189,982 | 7/1916 | McKay | 172/421 |
| 3,508,411 | 4/1970 | Rogers | 61/72.6 |
| 3,339,641 | 9/1967 | Carter | 172/40 |
| 205,325 | 6/1878 | Wiley | 37/193 |
| 3,326,010 | 6/1967 | Gagne | 172/40 X |
| 3,326,009 | 6/1967 | Gagne | 172/40 X |
| 2,859,676 | 11/1958 | Pottol et al. | 172/40 |
| 3,390,533 | 7/1968 | Gremillion | 172/40 X |
| 3,386,517 | 6/1968 | Kelley | 172/40 |

FOREIGN PATENTS OR APPLICATIONS 767,411  5/1934  France..........................172/40

*Primary Examiner*—Robert E. Pulfrey
*Assistant Examiner*—Clifford D. Crowder
*Attorney*—Gary, Juettner, Pigott, Cullinan and Pyle

[57] ABSTRACT

In a machine for cutting a slit trench, a plow member that projects downwardly into the ground is caused to move in an orbital cutting path by means of a rotary eccentric drive shaft that is connected with an above ground portion of the plow assembly at a first selected point of attachment and restraining means that is connected to the above ground portion of the plow assembly at a second selected point of attachment, the plow assembly being both supported and driven by said eccentric shaft and said restraining means, and being characterized in that the restraining means comprises a link extending transversely of the plow assembly at said second point of attachment. The link is pivotally mounted at one end of the machine frame and is pivotally connected at its other end to the plow assembly at said second point of attachment, thereby to limit the transverse movement of said second point, i.e., in the direction of the link, but without impairing the longitudinal movement of said second point, thereby compelling the lower end of the plow to move in an elliptical orbital path. As an alternative, producing essentially the same results, the link may be replaced by an oscillatory eccentric idler shaft.

15 Claims, 14 Drawing Figures

Patented Aug. 22, 1972

Inventors:
Raymond M. Ulrich
Solomon D. Ulrich
By Baty, Parker, Juettner & Cullinane
Attys Patented Aug. 22, 1972
3,685,591
9 Sheets-Sheet 2
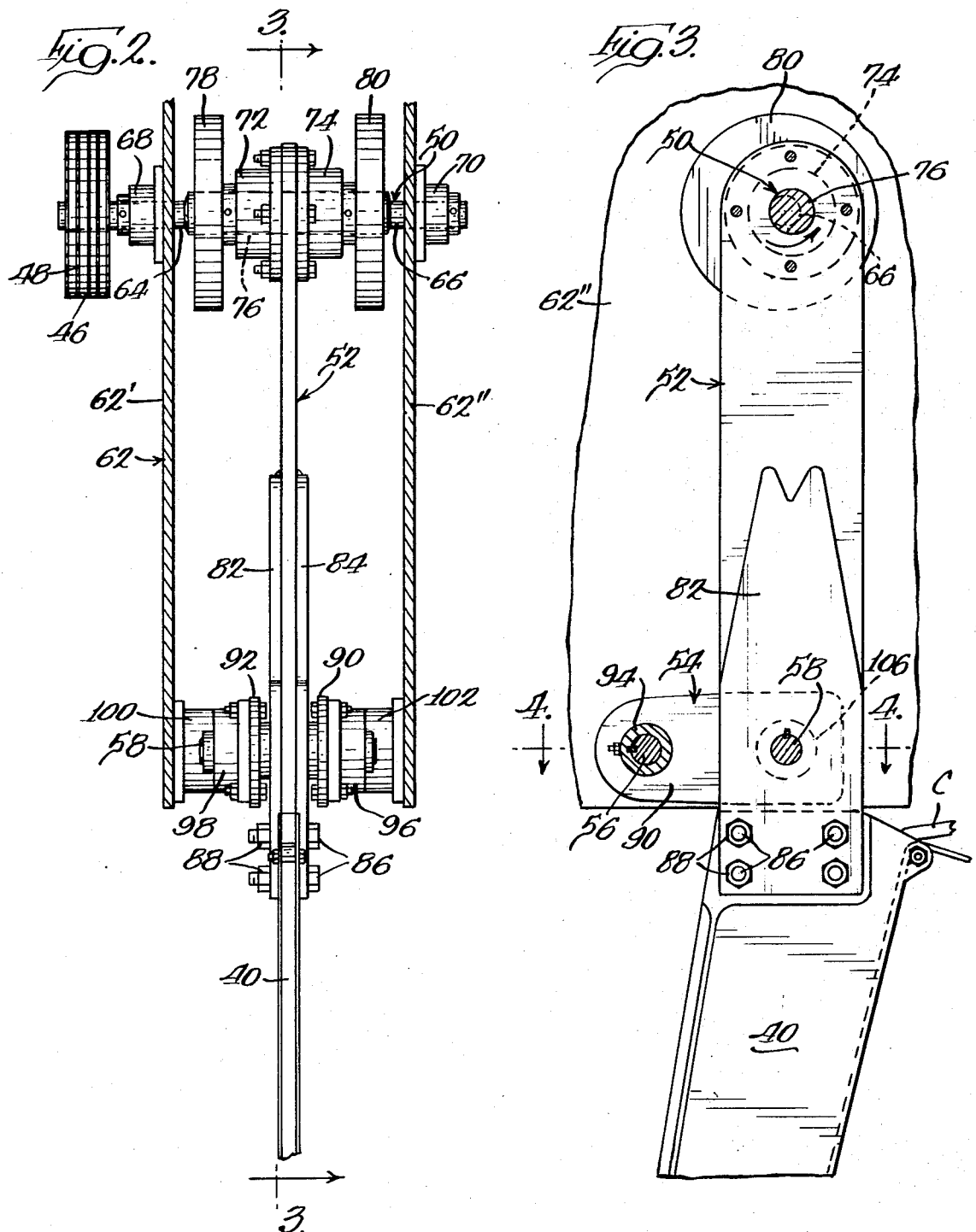
Inventors:
Raymond M. Ulrich
Solomon D. Ulrich
By Gary, Parker, Juettner & Cullinan
Attys Patented Aug. 22, 1972
3,685,591
9 Sheets-Sheet 3
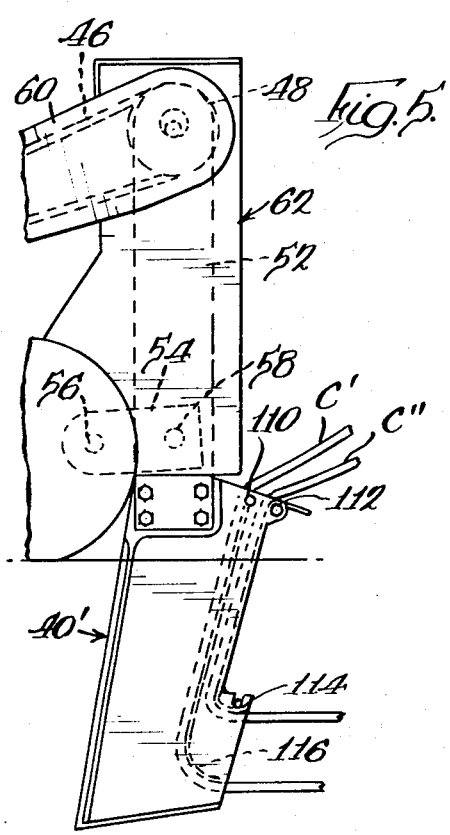
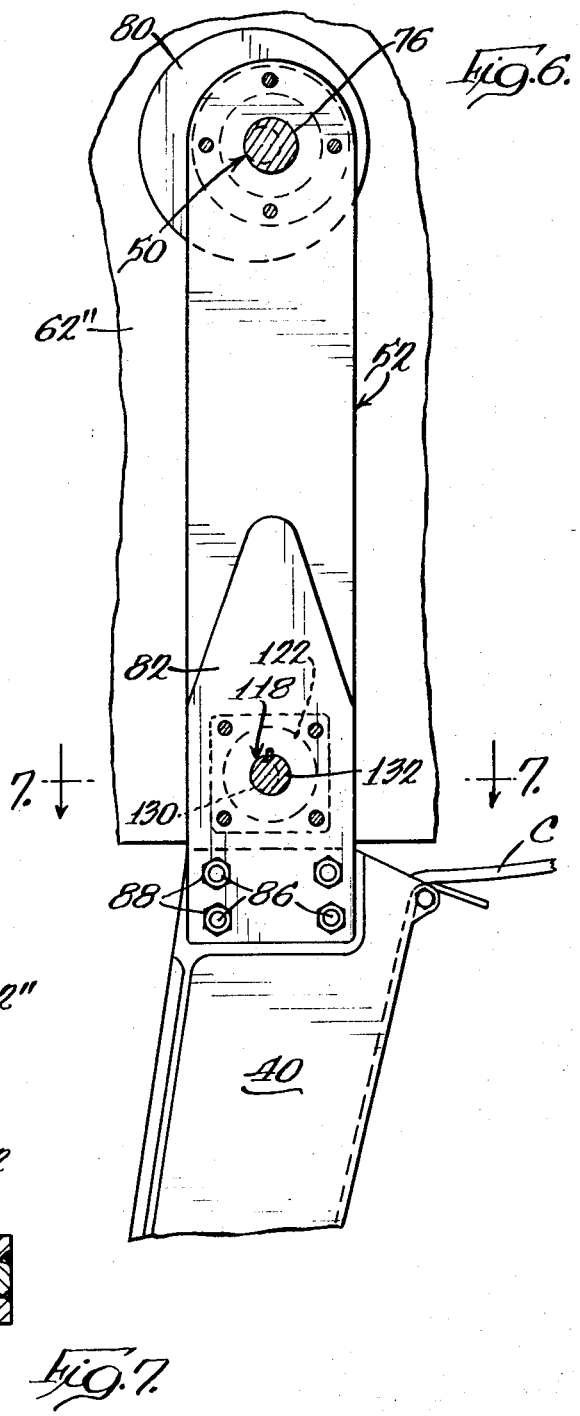
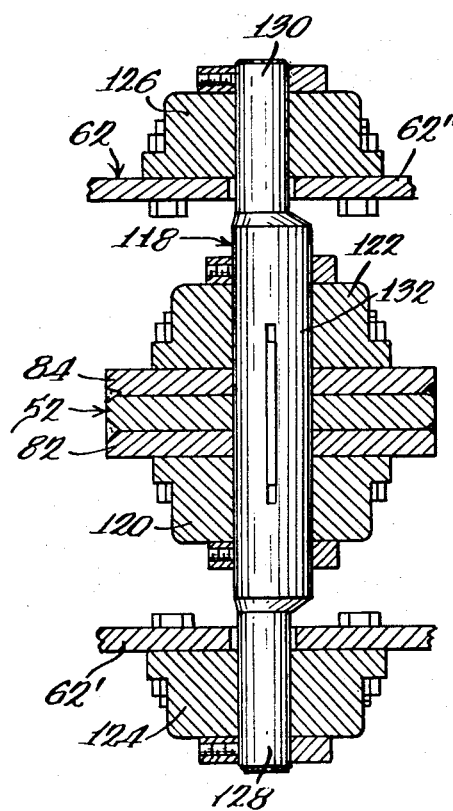
Inventors:
Raymond M. Ulrich
Solomon D. Ulrich
By
Gary, Parker, Juettner & Cullinan
Attys Patented Aug. 22, 1972

Inventors:
Raymond M. Ulrich
Solomon D. Ulrich

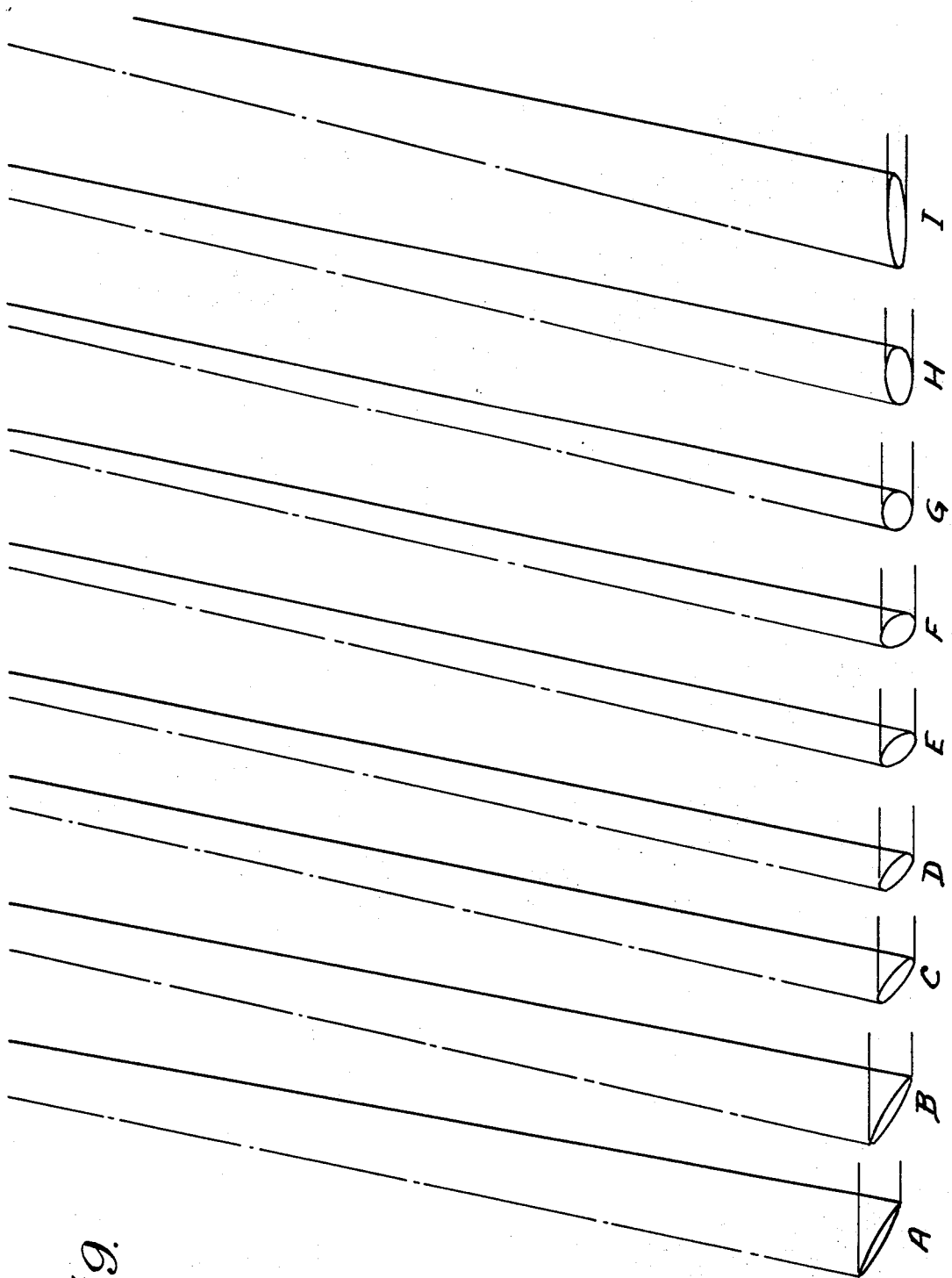

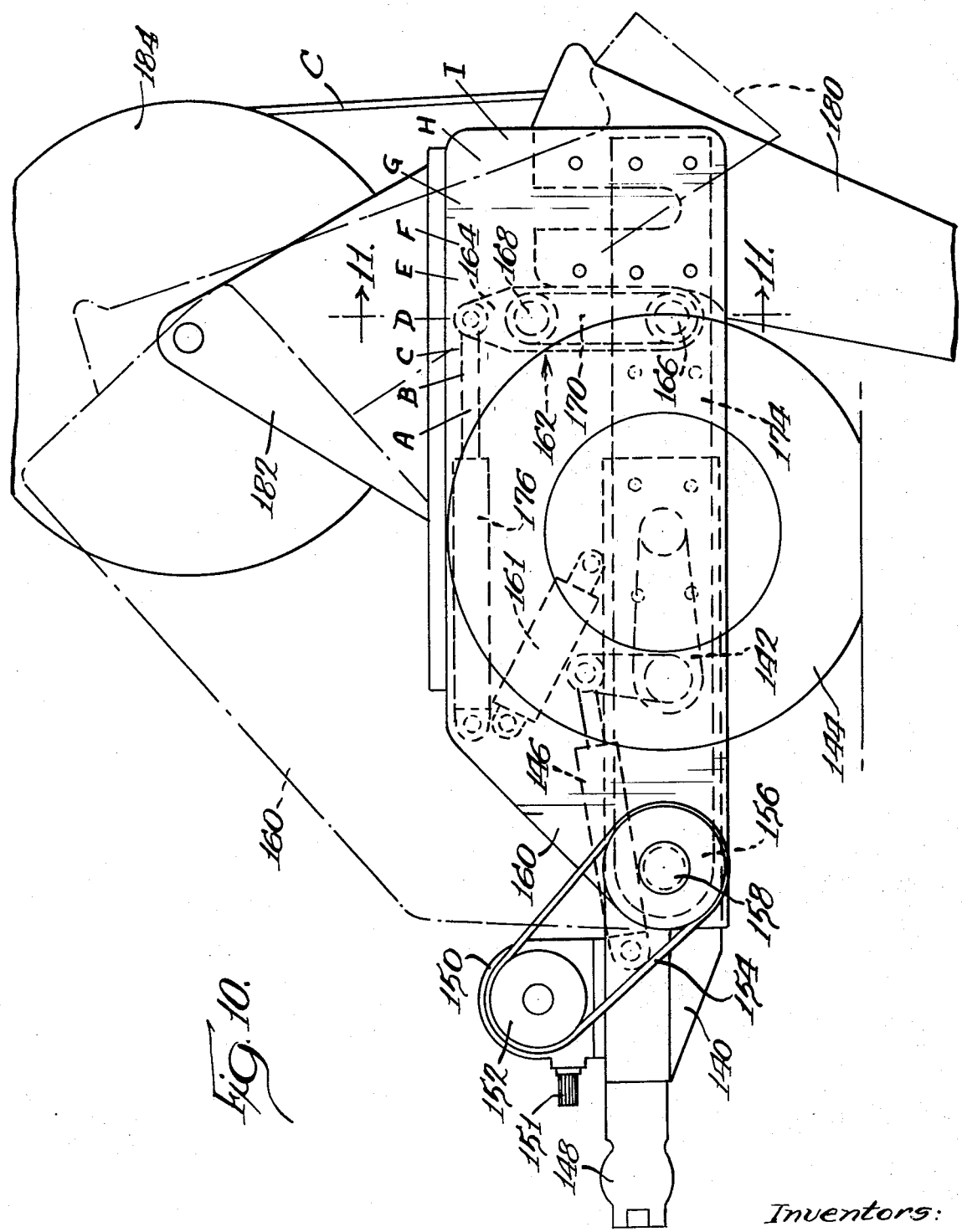

Patented Aug. 22, 1972

Inventors:
Raymond M. Ulrich
Solomon D. Ulrich

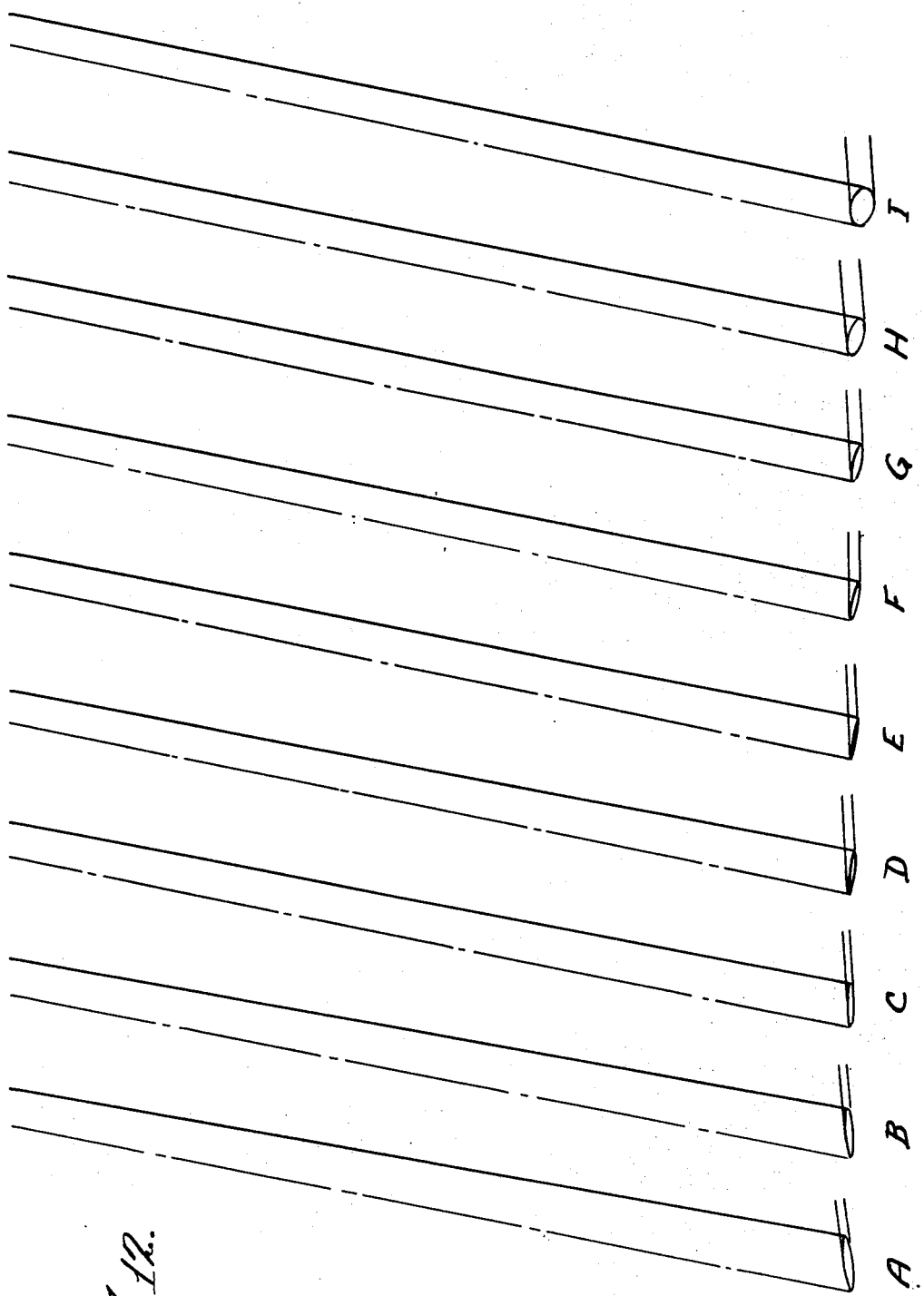

Inventors:
Raymond M. Ulrich
Solomon D. Ulrich 3,685,591

SLIT TRENCHING AND CABLE LAYING MACHINE WITH ORBITAL ACTION PLOW

CROSS-REFERENCE

This application is a continuation-in-part of application Ser. No. 616,585, filed Feb. 16, 1967, now abandoned.

BRIEF SUMMARY OF THE INVENTION

In the laying of flexible cable in a slit trench formed in the ground it is generally a problem to meet the power requirements necessary to form the slit trench at a reasonable rate of speed. It is an object of the present invention to provide an improved drive means which imparts a unique orbital action to the trench-forming plow member thereby reducing the power requirements necessary to operate the plow and the power and traction requirements for the ground-engaging vehicle which carries the plow member.

Another object of the invention is to provide an improved plow member for forming a slit trench in the ground and improved means for supporting one or more plow members and for controlling the movement thereof.

Numerous other objects and advantages of the invention will be apparent from the following description thereof.

Now, in order to acquaint those skilled in the art with the manner of making and using my invention, I shall describe, in conjunction with the accompanying drawings, certain preferred embodiments of the invention.

DESCRIPTION OF THE DRAWINGS

FIG. 2 is an enlarged vertical sectional view taken substantially along the line 2—2 of FIG. 1 showing the manner of mounting and driving a plow member which comprises the slit trench forming component of the apparatus of FIG. 1;

FIG. 3 is a vertical sectional view taken approximately along the line 3—3 of FIG. 2;

FIG. 5 is a fragmentary elevational view of an alternative form of plow member illustrating the manner in which a pair of flexible cables may be fed through a common hollow plow member in order to lay such cables in approximately the same vertical plane in a common slit trench but at different heights therein;

FIG. 6 is a fragmentary elevational view showing an alternative embodiment of the invention wherein the plow assembly is mounted intermediate its upper and lower ends on an idler offset shaft in place of the pivotally mounted link of FIG. 3 for controlling orbital movement of the plow;

FIG. 7 is an enlarged horizontal sectional view taken substantially along the line 7—7 of FIG. 6;

FIG. 9 is a graphic illustration of the variations in plow movement imparted by the adjustable link of FIG. 8;

FIG. 10 is a side elevation of the preferred embodiment of the invention wherein a generally vertical plow member is secured to a generally horizontal drive arm and an adjustable link connected to the arm provides for variations in plow movement.

FIG. 12 is a graphic illustration of the variations in plow movement obtainable by the adjustable link of the FIG. 10 embodiment of the invention;

Figure 1:
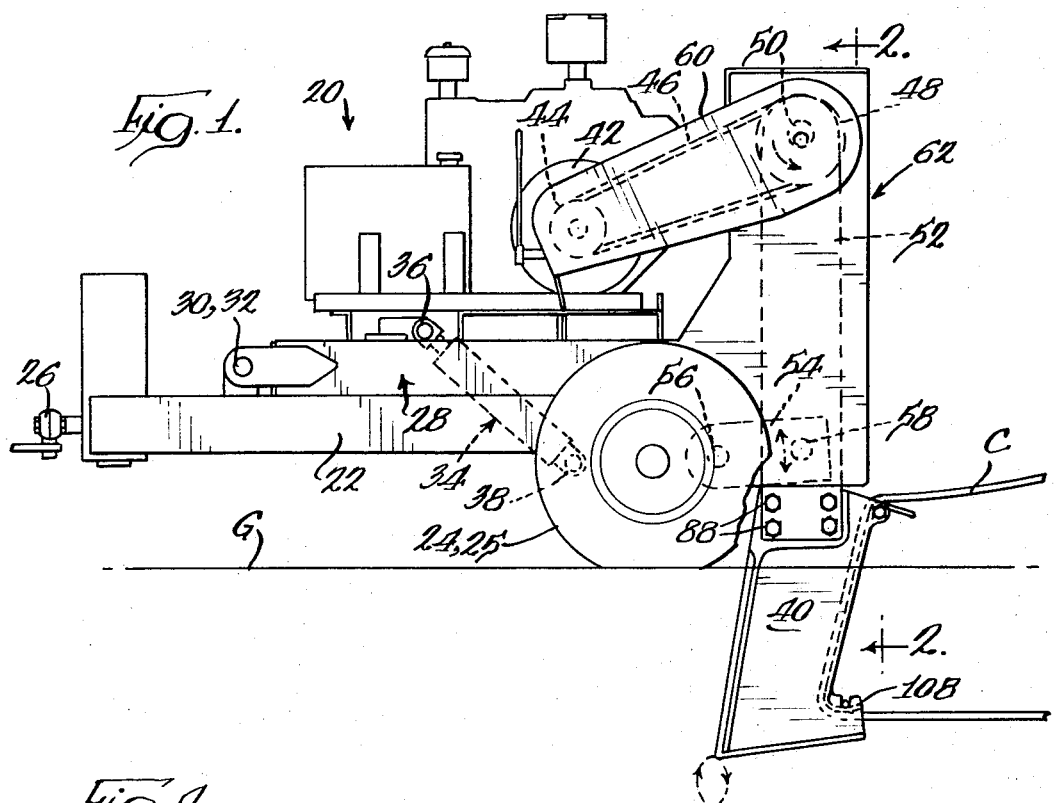
FIG. 1 is a side elevational view of a cable layer constructed in accordance with one embodiment of the present invention.

DETAILED DESCRIPTION OF THE INVENTION:

Referring now to the drawings, FIG. 1 shows a cable layer 20 comprising a lower frame 22 mounted at its rear end on a pair of wheels 24,25 and having shock and vibration absorbing connecting means 26 at its forward end for hitching the same to a tractor or the like. An upper frame 28 is pivotally connected to the lower frame by a pair of pivot pins or the like 30,32, and the upper frame is pivotally movable about the pins 30,32 between a lowered position as shown in FIG. 1 and a raised position (not shown) by means of a hydraulic cylinder assembly 34. The hydraulic cylinder assembly 34 has one end connected to the upper frame at 36 and its other end connected to the lower frame at 38. FIG. 1 shows the ground surface G, and it will be understood that a plow member 40 is disposed so as to project any desired distance, e.g. 24 inches, into the ground when the upper frame 28 is in its lowered position, and that the plow member 40 may be raised above the ground surface G when not in use by actuating the hydraulic cylinder 34 to raise the upper frame 28.

The upper frame 28 has mounted thereon a drive motor 42 including a motor pulley 44 which acts through a V-belt or the like 46 to rotate a drive pulley 48 and eccentric drive shaft 50. The drive shaft 50 serves to impart orbital movement to a vertical drive arm 52 to which the plow member 40 is rigidly attached. The orbital movement of the plow 40 is controlled in part by a link 54 which is pivotally connected to the lower frame 28 at 56 and is pivotally connected to the drive arm 52 at 58, as will be explained more fully hereinafter. If desired, a housing 60 may be utilized to protect the V-belt 46 and related components, and a housing 62 may be utilized to protect the drive arm 52 and related components. FIG. 1 further shows a flexible cable C which may be conducted down through the hollow plow member 40 so as to extend rearwardly out the lower end thereof and automatically be placed in a slit trench formed by the plow member.

Figure 4:
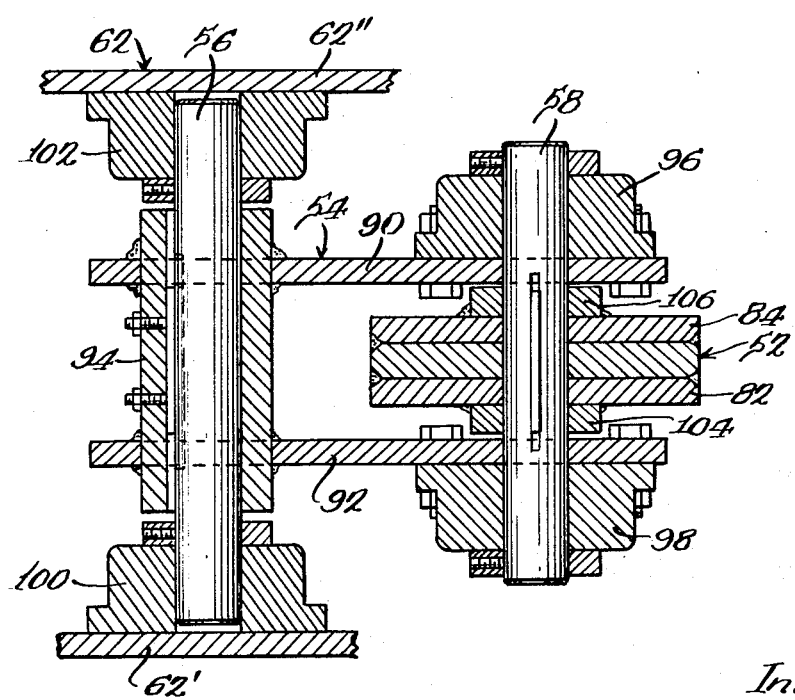
FIG. 4 is an enlarged horizontal sectional view taken along the line 4—4 of FIG. 3 showing a generally horizontal pivotally mounted link which is connected to the plow assembly intermediate the upper and lower ends thereof for controlling orbital movement of the plow.

FIGS. 2–4 illustrate in greater detail the mounting of the plow member 40 and drive arm 52 and the manner in which orbital movement is imparted thereto. The housing 62 comprises a pair of side plates 62' and 62" which are rigidly affixed to the upper frame 28 so as to be a part thereof, and the drive shaft 50 has its ends 64 and 66 supported in bearings 68 and 70 which are secured to the side plates 62' and 62", respectively. A pair of bearing hubs 72 and 74 are arranged in oppositely disposed relation and are bolted to opposite sides of the upper end of the drive arm 52 as best shown in FIG. 2, and an offset central portion 76 of the drive shaft 50 extends through such hubs and through the upper end of the drive arm 52. A pair of counterweights 78 and 80 are fixedly mounted on the drive shaft 50. Accordingly, upon rotation of the drive shaft 50 by the drive pulley 48, the offset portion 76 of the drive shaft will impart a circular orbital motion to the upper end of the drive arm 52.

The drive arm 52 has a pair of support plates 82 and 84 welded to opposite sides thereof at its lower end, and the plow member 40 has its upper end disposed intermediate the support plates 82 and 84, the plow being rigidly secured to the support plates by a plurality of bolts or the like 86 and nuts 88. In order to control the orbital movement of the plow member 40, the pivotal link 54 is connected to the drive arm 52 by the shaft 58 and to the housing 62 by the shaft 56. As best shown in FIG. 4, the link 54 comprises a pair of arms 90 and 92 which are welded or otherwise secured to a sleeve 94, and a pair of bearing hubs 96 and 98 are bolted to the ends of the arms opposite the sleeve 94 in order to accommodate the shaft 58. In addition, a pair of bearing members 100 and 102 are provided adjacent the inner walls of the side plates 62' and 62" in oppositely disposed relation so as to accommodate the ends of the shaft 56, and a pair of bearing hubs 104 and 106 are secured to the sides of the drive arm support plates 82 and 84. The shaft 56 extends through the sleeve 94 and has its ends supported in the bearing hubs 100 and 102, thereby pivotally connecting one end of the link 54 to the housing 62. The other shaft 58 extends through the drive arm 52 and through the link arms 90 and 92 and the bearing hubs 96 and 98 mounted thereon so as to pivotally connect the opposite end of the link 54 to the drive arm 52.

It will be understood from the foregoing that the pivot link 54 controls the movement of the drive arm 52 at the location of the shaft 58 so as to control the orbital movement of the lower end of the plow member 40. In the position of the link 54 shown in FIGS. 1 and 3, the shaft 58 will move in an arc about the axis of the shaft 56, and the angle through which the shaft 58 moves is sufficiently small that the movement of the shaft will be substantially vertical with only a slight horizontal component. Accordingly, the drive arm 52 will move substantially vertically with only a very slight horizontal component at the point of attachment with the shaft 58. In the embodiment being described the drive arm 52 and plow member 40 are disposed approximately vertically, and thus the vertical component of movement of the lower end of the plow 40 will be substantially equal to the vertical component of movement of the upper end of the drive arm 52 as determined by the amount of eccentricity of the offset portion 76 of the drive shaft 50.

On the other hand, the horizontal component of movement of the lower end of the plow member 40 depends not only upon the eccentricity of the offset portion 76 of the drive shaft 50, but also upon the disposition of the link 54 and the location of the point of attachment between the link 54 and the drive arm 52. For example, if the shaft 58 is located midway between the drive shaft 50 and the lower end of the plow member 40, and the link 54 is essentially horizontal, the horizontal component of movement of the lower end of the plow member 40 will be substantially equal to the horizontal component of movement of the upper end of the drive arm 52 as determined by the eccentricity of the offset drive shaft portion 76. However, if the point of attachment or location of the shaft 58 is above the midpoint between the drive shaft 50 and the lower end of the plow 40, the horizontal component of movement of the lower end of the plow will be increased, and if the shaft 58 is located below such midpoint the horizontal component of movement of the lower end of the plow will be decreased.

In the specific arrangement shown in FIG. 1, the link 54 is horizontal and the shaft 58 or point of attachment between the link 54 and the drive arm 52 is located below the midpoint between the drive shaft 50 and the lower end of the plow member 40. Consequently, the horizontal component of movement of the lower end of the plow 40 will be less than the vertical component of movement, thereby imparting orbital movement to the lower end of the plow along a path generally represented by a vertical ellipse. (See Illustration F in FIG. 9.)

FIG. 1 shows a cable C fed directly through the plow member 40 which in the embodiment being described is a hollow member. As shown, the cable C is conducted down into the upper end of the plow 40 and extends out of the lower end of the plow beneath a guide or lip 108 at the rear thereof. As the plow moves downwardly during its orbital movement around a path in the approximate form of a vertical ellipse, in a clockwise motion as viewed in FIG. 1, the guide or lip 108 tends to force the cable C down into the slit trench formed by the plow 40, and the effectiveness of this operation has been found to be generally good for average subsoil when the vertical component of movement of the lower end of the plow exceeds the corresponding horizontal component of movement. It will be understood that the slicing of the earth takes place on the upstroke of the plow 40 as the cable layer 20 moves forwardly or to the left as viewed in FIG. 1.

FIG. 5 shows an alternative embodiment of the invention wherein the components are identical to the embodiment of FIG. 1 except that a plow member 40' is provided with a pair of guide means 110 and 112 and at its upper end and a pair of guide means 114 and 116 at its lower end for accommodating a pair of flexible cables C' and C". Accordingly, the two separate cables C' and C" are fed into the upper end of the hollow plow member 40' and are guided out the lower end thereof so as to be disposed approximately in a common vertical plane but with one cable disposed a predetermined distance above the other. Such an arrangement is suited for the laying of a pair of cables or the like at different heights in a common slit trench formed by the plow member 40'.

FIGS. 6 and 7 disclose an alternative where the pivotal link 54 is replaced by an offset idler shaft 118. In the embodiment of FIGS. 6 and 7 a pair of bearing hubs 120 and 122 are bolted to the drive arm support plates 82 and 84, respectively, and a second pair of bearing hubs 124 and 126 are bolted to the outer surfaces of the housing side plates 62' and 62''. The idler shaft 118 has a pair of end portions 128 and 130 and an offset intermediate portion 132. The idler shaft 118 extends through the drive arm 52 and hub members 120 and 122, and the shaft end portions 128 and 130 are journalled in the bearing hubs 124 and 126 so as to be supported by the housing side plates 62' and 62''.

As the offset drive shaft 50 rotates so as to impart a generally circular orbital movement to the upper end of the drive arm 52, the offset idler shaft 118 will move through an angle of less than 180°, and in the embodiment being described the latter angle will be approximately 95°. Because the offset idler shaft 118 in effect provides a substantially shorter lever arm than the pivotally mounted link 54 of FIGS. 1-4, while moving through a substantially greater angle than the link 54, the use of the idler offset shaft 118 greatly minimizes any wear of the bearings which support the same. In other words, if in certain applications use of the pivot link 54 to control the movement of the drive arm 52 produces any undue bearing wear due to the relatively small arc through which the link pivots during operation of the drive arm 52, then any such bearing wear problem can be substantially eliminated by substitution of the idler offset shaft 118.

Figure 8:
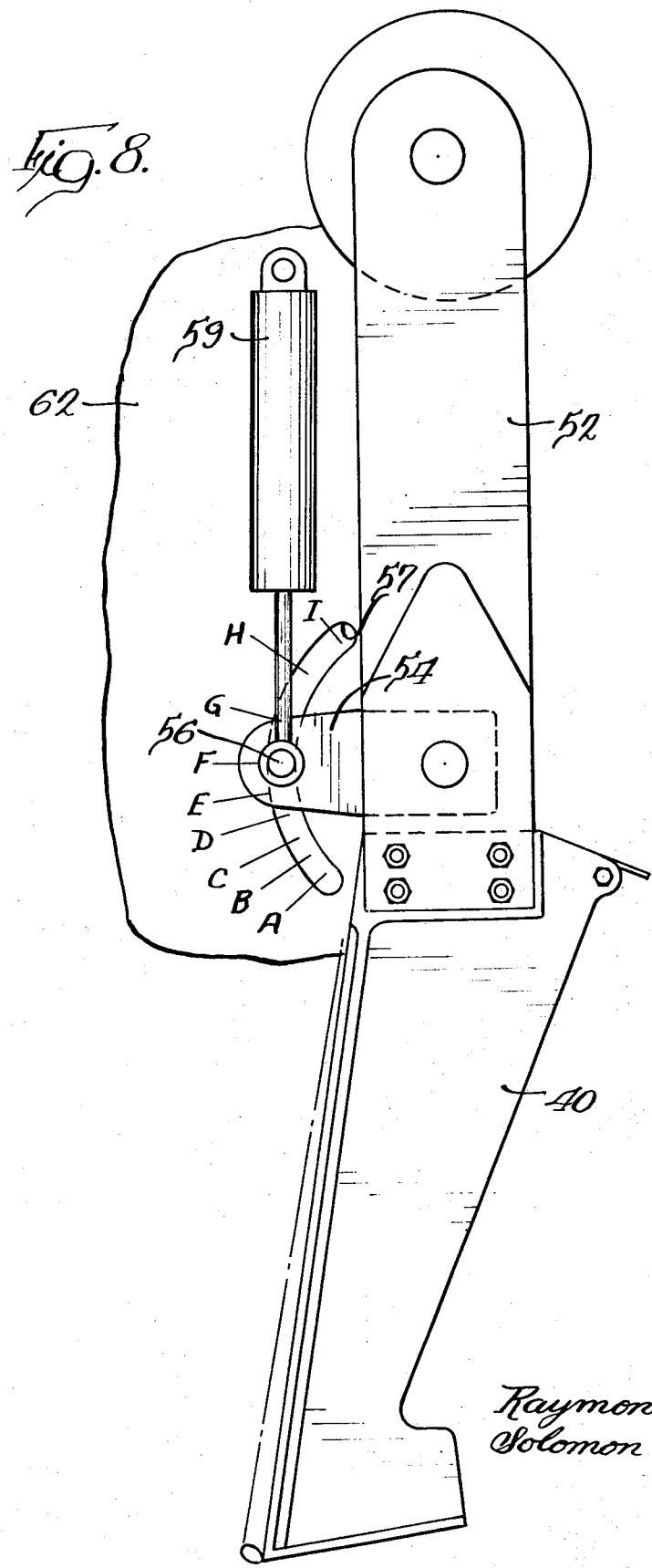
FIG. 8 is a fragmentary elevational view of the FIG. 1 or FIG. 5 embodiment of the invention equipped with an adjustable plow controlling link for imparting variations to the orbital movement of the plow to meet varying subsoil conditions.

Reference is now made to FIGS. 8 and 9 which show the variety of effects which can be obtained by adjusting the position of the link 54, together with means for adjusting the link while the apparatus is in use thereby quickly to adjust the plow to the movement best suited for the subsoil conditions being encountered by the same. A fixed pivot position of the link 54 or the offset shaft 118 may be utilized for known conditions or for particular jobs, but provision for adjustment of the link to correlate plow movement to specific conditions encountered thereby from time to time affords a more universally adaptable and more broadly usable machine, as will presently appear.

As shown in FIG. 8, the link mounting pin or shaft 56 is arcuately adjustable in a curved slot 57 formed in the side walls of the housing 62 from a position "F" perpendicular to the plow driving arm 52 to positions inclined both upwardly and downwardly therefrom. The slot 57 may take various forms, but in FIG. 8 the same is shown as an arc of a circle concentric with the pivot pin 58 on the arm 52 so as not to so modify the movement of the arm or the plow as to disturb or cause interference with other components of the complete assembly. While the link 54 could be manually adjusted in the slot, or by means of a series of arcuately arrayed holes in the housing 62, it is much more advantageous to have the link adjustable from a remote location during actual operation of the plow so as to quickly adjust the plow movement to varying conditions as they occur. For this purpose, we have provided a hydraulic cylinder 59 pivotally mounted on the housing 62 and pivotally connected to the pin or shaft 56 so that an operator can instantaneously change the location of the pin 56 while the plow is in operation.

The effect of changing the location of the pin 56 and thus the disposition of the link 54 is graphically portrayed in FIG. 9, wherein illustrations "A" through "I" show the movement imparted to the leading edge of the plow 40 when the link 54 is in positions "A" through "I" of FIG. 8, respectively. Illustration "F" shows the plow action when the link 54 is perpendicular to the plow and wherein the bottom front tip of the plow describes a generally vertical ellipse and the remainder of the points on the leading edge of the plow describe generally similar ellipses of a progressively decreasing dimension in the upward direction. This is deemed a fairly good general purpose movement.

By depressing the link 54 down to the bottom position "A" of FIG. 8, the plow describes the movement shown in illustration "A" of FIG. 9 wherein the bottom front tip of the plow, while still moving orbitally, practically reciprocates back and forth in an upwardly and forwardly inclined path and the entire leading edge of the plow describes essentially the same kind and extent of movement. This movement is deemed advantageous when encountering tenacious subsoil conditions, such for example as heavy clay, earth containing tree roots and the like, inasmuch as the plow then performs almost a "sawing" action.

As another example, should the soil contain rocks and the like, it would be desirable to raise the link 54 back up to position "D," for example, wherein the lower front tip of the plow, and the reaminder of the leading edge thereof, will describe an upwardly inclined and horizontally elongated elliptical movement producing a lifting action for forcing rocks, stones and the like upwardly out of the soil or for otherwise displacing the same, while at the same time subjecting the rocks to repeated fracturing forces, whereby the plow may effectively make a slit trench in even rocky soil at minimum expenditure of energy and with maximum speed.

On the other hand, when encountering soft or sandy soil, it is desirable to make as much speed as possible with the same expenditure of energy, and it then is desirable to develop as much horizontal movement as possible. For this purpose, the operator may shift the link 54 to its full up position "I," wherein the blade as shown in Illustration "I" of FIG. 9 will move essentially horizontally in a fairly long stroke to provide for maximum forward progress.

A particular advantage of remote link adjustment during plow operation is that the operator need not know what kind of soil he is encountering. Should the machine start vibrating excessively, all he has to do is operate the hydraulic cylinder 59 until he reaches the point of minimum vibration, whereupon he will have adjusted the link 54 to a position which in the vast majority of cases will produce the most advantageous plow movement under the circumstances then being encountered. In this manner, a universally adaptable machine is provided.

Figure 11:
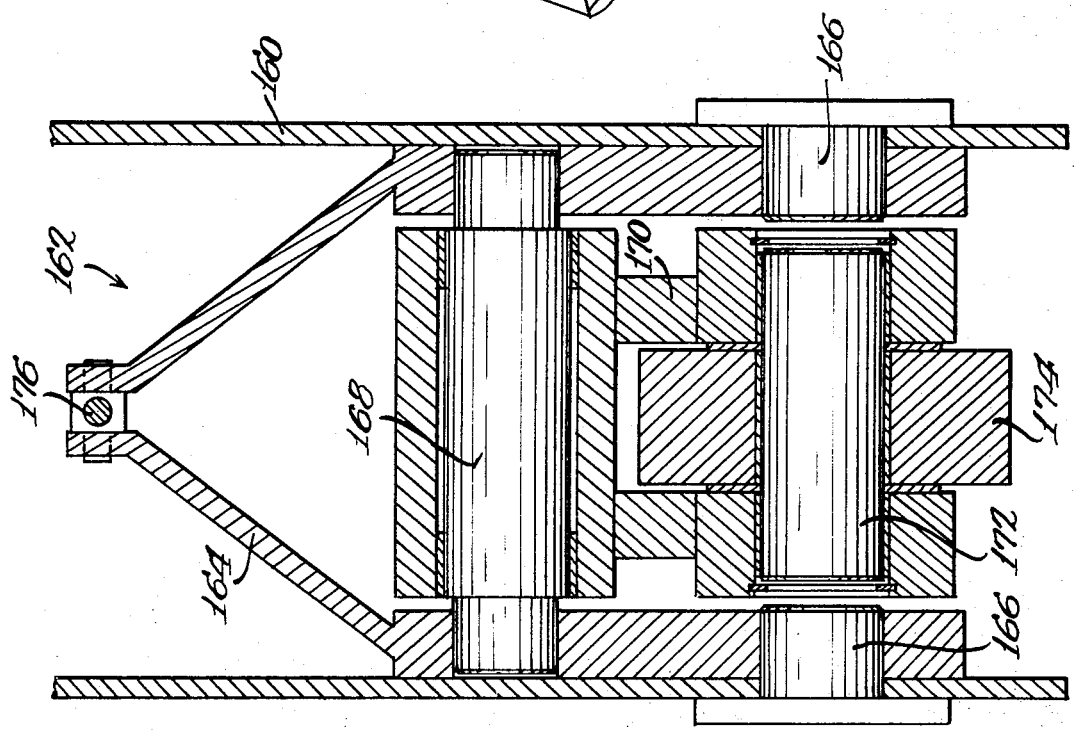
FIG. 11 is a vertical sectional view taken substantially along the line 11—11 of FIG. 10 showing the preferred adjustable link assembly.

Referring now to FIGS. 10 and 11, we have shown a preferred embodiment of our machine characterized by compactness, low profile, excellent stability and economy. In this machine, in distinction to the one previously described, we have provided for power supply from the pulling vehicle and have mounted the plow driving arm horizontally to attain the above stated advantages.

As shown, the machine comprises a main frame 140 which is generally of U-shape. Pivotally mounted on the legs of the main frame are a pair of bell crank levers 142 which carry ground engaging machine supporting wheels 144. Each lever 142 is independently adjustable by means of a respective hydraulic cylinder or jack 146, whereby the wheels may be adjusted to different levels for maintaining the frame 140 horizontal when the machine is traversing irregular terrain, e.g., operating along the side of a hill. Also, the wheels may be adjusted to provide a deep or shallow cut by the plow, etc. At its forward end, the main frame 140 is provided with a trailer hitch 148 for securing the same to a pulling vehicle, such as a tractor. The hitch 148 is of a shock and vibration absorbing construction, such as one containing internal rubber components, mitigating transmission of shock and vibration from the cable laying machine to the pulling vehicle.

Immediately above the hitch, the main frame 140 carries a gear box 150 provided with a splined input shaft 151 for connection with the power takeoff shaft conventionally provided at the rear of tractors. In this regard, we have found that our plow performs practically all of the work involved in forming a slit trench and that there is practically no load imposed on the pulling vehicle. Consequently, practically the full power capability of the vehicle is available through the power takeoff to drive the plow, because this energy is not required at the vehicle itself to pull the plow with brute force through the soil. Thus, a separate power source on the plow, as in the embodiment of FIG. 1, is not necessary unless the machine is going to be pulled by a small vehicle of very limited power and/or having no power takeoff. Since the latter condition is rather rarely encountered in practice, we have in this embodiment provided for power supply from the pulling vehicle rather than from a self contained power plant, thereby substantially to reduce the cost of machine construction.

The output pulley 152 of the gear box 150 is coupled by chain or belt drive 154 to a complemental pulley 156 on a main power shaft 158 which extends transversely of and is journalled adjacent its ends in the side legs of the main frame 140.

Pivotally mounted on this same shaft 158 is a lift frame 160, also of generally U-shape but opposed to and fitting around the frame 140. Extending between the two frames is a hydraulic jack 161 for raising and lowering the lift frame 160 about the axis of the shaft 158 relative to the frame 140 for the purpose of lifting the plow out of the ground (for machine transport) and for lowering the plow into the ground for use.

Adjacent the rearward end thereof, the lift frame 160 carries a plow adjusting link assembly, indicated generally at 162. This assembly, as shown in FIGS. 10 and 11, is comprised of an inverted generally U-shaped bracket 164 which is pivotally mounted adjacent the lower ends of the legs thereof on the lift frame by means of pivot pins 166. Adjacent the upper ends of the legs thereof, the bracket 164 carries a cross pin 168 on which is pivotally mounted a depending link 170. Adjacent its lower end, this link is pivotally connected by a pin 172 to an operating arm 174, the link being adjustable to vary the movement permitted of the arm at the point of connection thereto of the link.

In this embodiment of the invention, the operating arm 174 extends horizontally within the lift frame 160 from end to end thereof. At its forward end, the arm 174 carries bearings similar to those provided at the upper end of arm 52, and the shaft 158 is provided centrally thereof with an eccentric similar to that of shaft 50, all as shown in FIGS. 2 and 3, whereby the shaft 158 imparts orbital movement to the forward end of the operating arm 174 in the same manner as previously described in connection with FIGS. 2 and 3. The link 170 in turn supports and constrains the arm 174 adjacent its rearward end whereby to restrict the movement of said end in accord generally with the principles previously discussed in connection with the link 54. Moreover, the link 170 is adjustable to attain the objectives discussed in conjunction with FIGS. 8 and 9. For purposes of link adjustment from a remote location during operation of the plow, a hydraulic jack 176 extends between the lift frame 160 and the upper end of the bracket 164.

By disposing the drive arm horizontally (rather than vertically as in FIG. 1) and locating the same within the confines of the simple U-frames 140 and 160, the center of gravity as well as the profile of the machine is lowered substantially, whereby to enhance machine stability.

Adjustably bolted to and depending from the operating arm 174 is a substantially vertically disposed plow member 180, generally the same as and having the same functions and purposes as the plow 40 previously described. As indicated by the holes in the operating arm 174, the plow can be mounted in different positions thereon to afford somewhat modified operating characteristics.

In this embodiment of the invention, due particularly to its compactness and low profile, a supply of cable can be carried directly by the lift frame 160. For this purpose, stanchions 182 may be provided on the legs of the frame near the rearward end thereof for reception of a supply spool 184 of the cable C.

The particular operation of the plow 180 in different positions of the link 170 is graphically portrayed in FIG. 12. As there shown, essentially the same characteristics of plow movement can be provided as were discussed in conjunction with FIG. 9, with the exception that they occur in different relative positions. For example, position "E" of FIG. 12 corresponds approximately to position "A" of FIG. 9; position "H" of FIG. 12 corresponds approximately to position "D" of FIG. 9; position "I" of FIG. 12 corresponds approximately to position "F" of FIG. 9; and position "A" of FIG. 12 corresponds approximately to position "I" of FIG. 9. Nevertheless, essentially the same plow movements accompanied by the respective advantages discussed in conjunction with FIG. 9 are provided, and the operator is again provided the means for adjusting the link during plow operation to the point of minimum machine vibration, whereby to afford a universally adaptable cable laying machine.

A particular advantage of the structure of FIGS. 10 and 11, as revealed by FIG. 12, is that substantially all points on the leading edge of the plow have very nearly the same movement as the bottom front tip of the plow in all positions of the link, whereby to produce a more uniform effect over the full length of the plow than was true with the FIG. 8 embodiment.

Figure 13:
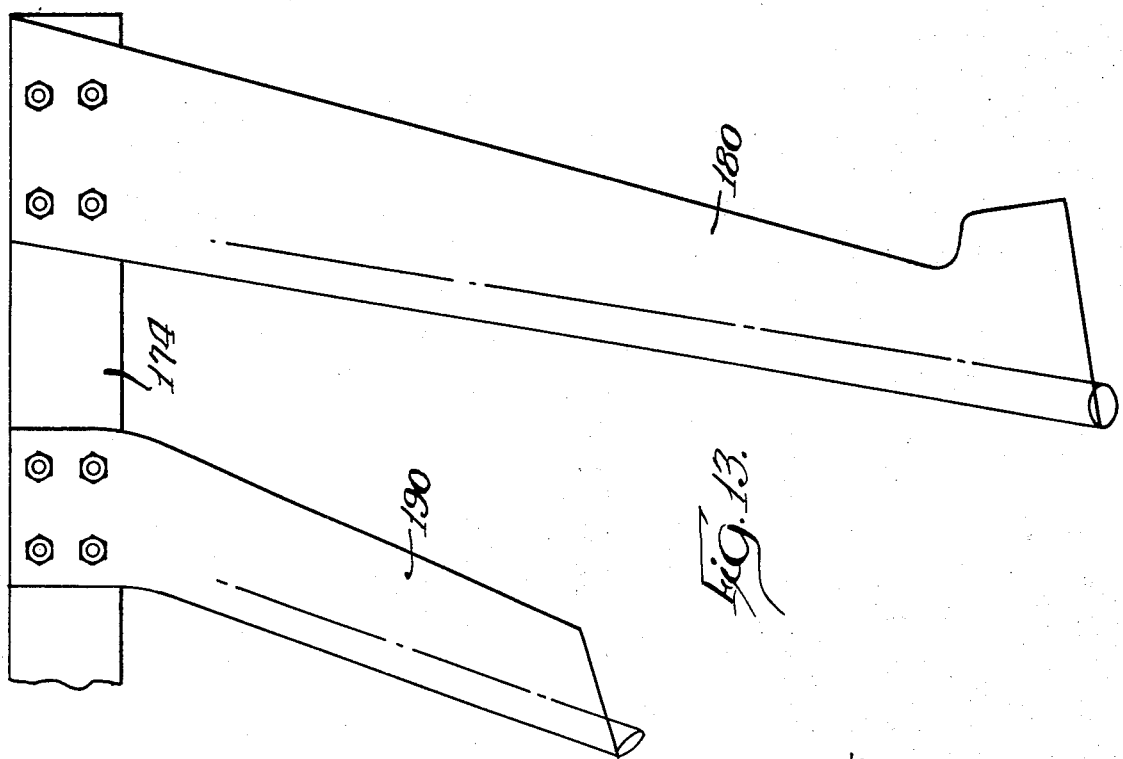
FIG. 13 is a graphic illustration of the positions and movements of two plows of different lengths mounted in longitudinally spaced relation on the plow driving arm of the apparatus of FIG. 10.

A further advantage of the structure of FIGS. 10 and 11 is the facility with which special purpose plows or blades can be mounted thereon. For example, referring to FIG. 13, we have shown somewhat schematically a special short cutter or ripper blade 190 mounted on the operating arm 174 forwardly of the plow 180. The blade 190 would be of particular advantage when, for example, the machine is traversing or moving along the edge of a compacted gravel or asphalt roadway, wherein the short but sharp leading blade 190 would slice through the gravel and asphalt and open it up for convenient passage of the main plow 180, which might at that time be best adjusted for a subsoil condition drastically different from that of the asphalt or gravel surfacing. In particular, as shown in FIG. 13, due to the different locations and lengths of the blade and the plow, the plow 180 has a movement well suited for average subsoil conditions, while the blade 190 has a movement ideal for the rocky type of conditions it is encountering — both movements being provided by a single position of the link 170, specifically position "I" depicted in FIG. 10. For the purposes described, the blade 190 may appropriately be about 18 inches long and the plow 180 about 36 inches long.

Of particular significance is the fact that the main drive shaft 158 has a fixed relationship to all operating components of the machine, whereby duplication of elements and provision of take up devices and the like are eliminated. The shaft 158 has a constant positional relationship with the power input components 150-156 and due to pivoting of the lift frame directly on the shaft also has a constant positional relationship with the driven end of the operating arm 174. Therefore, no disconnection or duplication of any components is required to accommodate the pivoting movements of the lift frame, therefore further contributing to the compactness and economy of the machine.

Figure 14:
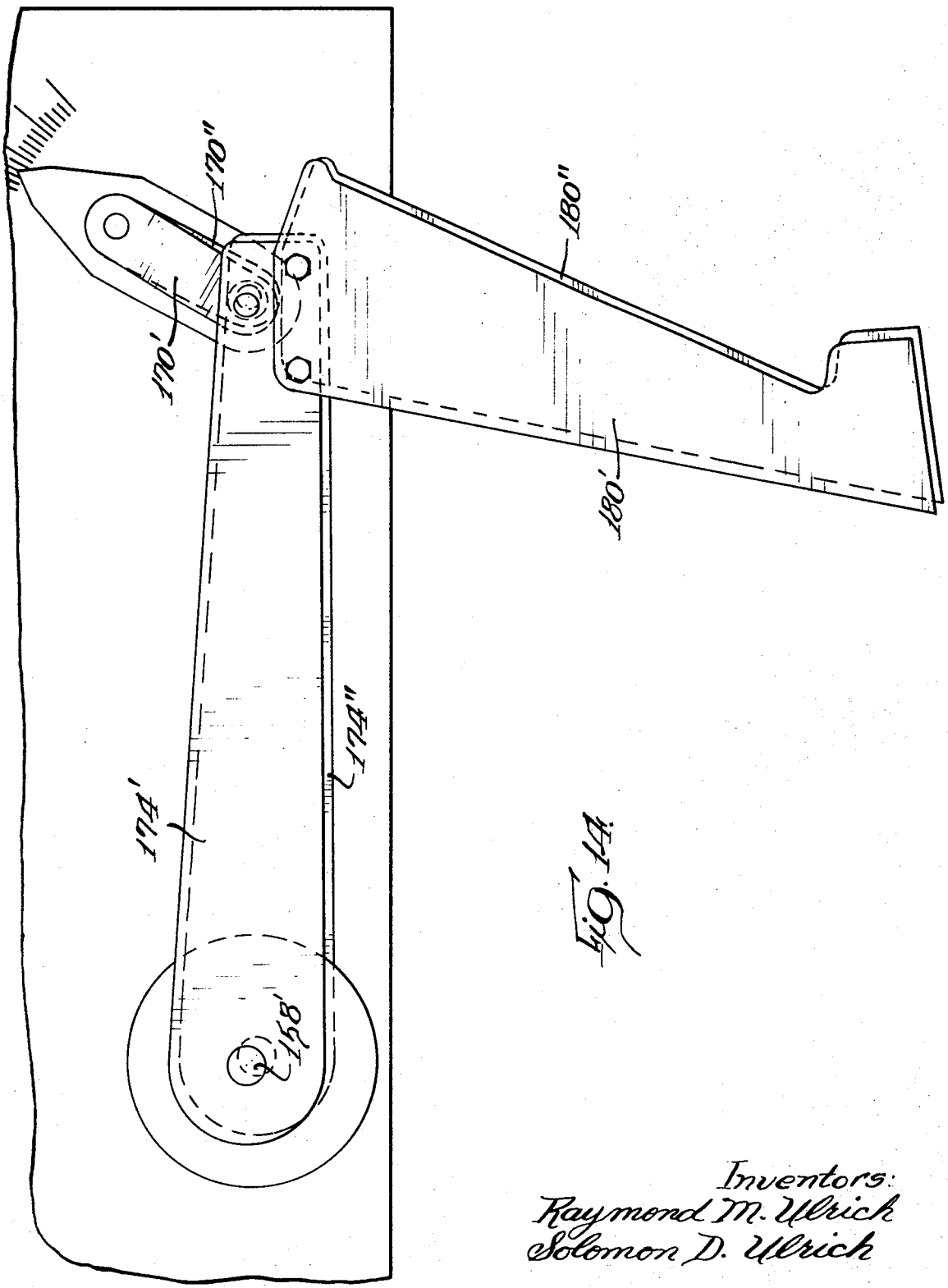
FIG. 14 is a fragmentary side elevational view showing a further alternative embodiment of the present invention where a pair of generally vertical plow members are secured respectively to generally horizontal drive arms and the latter are driven by respective eccentrics which are out of phase with one another to provide a double acting plow assembly.

Referring now to FIG. 14, we have shown a further embodiment of our invention predicated upon the FIG. 10 species but characterized by the provision of two operating arms 174' and 174'', two links 170' and 170'', two plows 180' and 180'', and a double eccentric on the shaft 158 for driving the two arms 180° out of phase from one another (or at any other phase spacing desired). With this arrangement, by mounting two plows 180' and 180'' side by side, the movement is effectively doubled so that one plow is always digging forwardly while the other is retracting thereby to provide greater forward progression of the machine under the most adverse of conditions. Also, this double acting arrangement accommodates disposition of a blade or plow on one arm forwardly of a blade or plow on the other arm with alternate effective or forward strokes thereof for conservation of energy where spaced blades or plows are desired. Also, in this condition, the individual links 170' and 170'' may be adjusted independently of one another to provide for optimum actuation of each blade or plow. Manifestly, such spaced blades or plows may be offset from their respective arms to the center line between the two arms, so as to work on a common line, i.e., a common slit trench. This arrangement furthermore provides a dynamically balanced structure, or at least one having essential dynamic balance, whereby to mitigate machine vibration.

While the advantages of the FIG. 14 embodiment of the invention are significant, they are obtained only by the addition of machine components and thus at additional cost over the embodiment of FIG. 10. As presently contemplated, the embodiment of FIG. 10 is entirely adequate for the vast majority of work to be encountered, and we therefore do not contemplate that the structure of FIG. 14 would be preferred over the structure of FIG. 10 except for very large machines cutting either very wide or very deep trenches and/or for machines operating essentially or primarily in rock. However, the advantages of a dynamically balanced two plow assembly are not to be minimized, even though the structure is not the one presently preferred.

While the machine of the invention has been referred to herein as a cable laying machine, it is to be observed that the same is superbly adapted to performance of other functions such as laying plastic pipe and conduit up to 2½ inches or more in diameter; pulling steel pipe up to 1½ inches and more and up to lengths of 500 feet and more into and through the ground; subsoiling, i.e., aerating and opening up drainage in bottom lands and flooded acreage; and for inserting a layer of liquid asphalt in arid soils for retention of surface moisture. In some of these applications, such as subsoiling, the lower edge of the plow might well be cylindrical or carry a ball-shaped element. In the laying of asphalt, the lower edge of the plow would probably carry a flat shovel like shoe for distributing asphalt over a fairly wide path, in which case the plow would be operated in an essentially horizontal stroke, i.e., position "I" of FIGS. 8 and 9 or positions "A," "B" or "C" of FIGS. 10 and 12.

Accordingly, while we have described our invention with regard to a certain preferred form, we do not intend to be limited to such form, nor to the other embodiments here illustrated and described, since modifications coming within the scope of our invention will readily occur to those skilled in the art, particularly with our disclosure before them.

We claim:

1. In a cable layer, in combination, first frame means equipped with wheels for rolling along the ground surface, second frame means carrying a plow assembly comprising a drive arm and a plow member rigidly attached to said drive arm for forming a slit trench in the ground, said second frame means being movable relative to said first frame means between an upper position wherein said plow member is disposed above the ground surface and a lowered position wherein said plow member extends beneath the ground surface to form a slit trench therein, said drive arm being carried by said second frame means in a longitudinally extending generally horizontal position and said plow member extending downwardly from adjacent the rearward end thereof, drive means including an eccentric drive shaft connected with the forward end of said arm for imparting orbital movement to said plow assembly, and a link extending transversely of said arm adjacent the rearward end thereof, said link being pivotally connected at one of its ends to said second frame means and being pivotally connected at its other end to said arm so as to limit the component of movement of the rearward end of said arm axially of said link without impairing the longitudinal movement of said arm, thereby to cause the lower end of said plow member to move in an elliptical orbital path.

2. In a cable layer having a frame, a plow assembly on said frame positioned so that its lower end will project downwardly into the ground to form a slit trench therein, drive means on said frame for imparting orbital movement to said plow assembly, said drive means comprising an eccentric drive shaft connected with said plow assembly at a first selected point of attachment thereon, and restraining means connected to said plow assembly at a second point of attachment thereon for controlling the orbital movement of said plow assembly, the improvement wherein the plow assembly is both supported and driven by said drive means and said restraining means, and said restraining means comprising a link extending transversely of said plow assembly at said second point of attachment, said link being pivotally mounted on said frame at one of its ends and being pivotally connected at its other end to said plow assembly at said second point of attachment so as to limit the component of movement of said second point axially of said link without impairing longitudinal movement of said plow assembly at said second point, thereby to cause the lower end of said plow assembly to move in an elliptical orbital path.

3. The invention of claim 2 wherein said frame comprises a first frame means and a second frame means, said drive means being mounted on said first frame means with said shaft extending transversely of and journalled on said first frame means, said second frame means being pivotally mounted on said shaft, said plow assembly being mounted on said second frame means with said first point of attachment thereon continuously engaging the eccentric on said shaft, whereby said second frame means may be pivoted relative to said first frame means to swing said plow assembly into and out of the ground without disturbing the drive connection between said shaft and said plow assembly.

4. The invention of claim 2 including means adjustably mounting said link on said frame, and means for adjusting said link on said frame to different positions relative to said plow assembly.

5. The invention of claim 4 wherein the means for adjusting said link comprises power means operable from a remote location during operation of the plow assembly.

6. The invention of claim 4 wherein said plow assembly is disposed substantially vertical, said eccentric is connected with the upper end portion of said plow assembly, said link is pivotally connected to the medial portion of said plow assembly, and said link is adjustable on said frame in an arc about the pivotal connection of said link to said plow assembly.

7. The invention of claim 6 wherein said link is adjustable from a position perpendicular to said plow assembly to positions inclined upwardly and downwardly from said perpendicular position.

8. In a cable layer having a frame, a plow assembly on said frame positioned so that its lower end will project downwardly into the ground to form a slit trench therein, drive means on said frame for imparting orbital movement to said plow assembly, said drive means comprising an eccentric drive shaft connected with said plow assembly at a first selected point of attachment thereon, and restraining means connected to said plow assembly at a second point of attachment thereon for controlling the orbital movement of said plow assembly, the improvement wherein said plow assembly comprises a plow extending downwardly from the rearward end of said frame and an operating arm extending generally horizontally and connected adjacent its rearward end to said plow, said eccentric drive shaft is connected with the forward portion of said arm, and said restraining means comprises a link pivotally mounted on said frame at one of its ends and pivotally connected at its other end to the rearward portion of said arm so as to limit the component of movement of said rearward portion of said arm axially of said link.

9. The invention of claim 8 including a bracket pivotally mounted on said frame adjacent the rearward end of said arm, said link being pivotally connected to said bracket at a location spaced from the pivotal mounting of said bracket and from said arm, and means for moving said bracket for adjusting said link relative to said arm.

10. The invention of claim 8 including a second plow member mounted on said arm in spaced relation to the first-named plow.

11. In a cable layer having a frame, a plow assembly on said frame positioned so that its lower end will project downwardly into the ground to form a slit trench therein, drive means on said frame for imparting orbital movement to said plow assembly, said drive means comprising an eccentric drive shaft connected with said plow assembly at a first selected point of attachment thereon, and restraining means connected to said plow assembly at a second point of attachment thereon for controlling the orbital movement of said plow assembly, the improvement comprising a pair of said plow assemblies, a pair of said eccentrics disposed in out-of-phase relationship with one another and connected respectively with said assemblies, and a pair of said restraining means connected respectively to said assemblies, each said restraining means comprising a link pivotally mounted on said frame at one of its ends and pivotally connected at its other end to the respective plow assembly so as to limit the component of movement of the respective plow assembly axially of said link at said second point of attachment.

12. The invention of claim 11 including means on said frame for adjusting each of said links to different positions relative to their respective plow assemblies.

13. In a cable layer having a frame, a plow assembly on said frame, said assembly including an operating arm and a plow connected at its upper end to one end of said arm and positioned so that its lower end will project downwardly into the ground to form a slit trench therein, drive means on said frame for imparting orbital movement to said plow assembly, said drive means comprising an eccentric drive shaft connected with said arm adjacent the other end of said arm, and restraining means connected to said arm adjacent said one end thereof for controlling the orbital movement of said plow assembly, the improvement wherein the plow assembly is both supported and driven by said drive means and said restraining means, and said restraining means comprises an oscillatory member pivotally connected with said arm adjacent said one end thereof and pivotally mounted on said frame transversely of said one end of said arm, said oscillatory member oscillating in the direction longitudinally of said arm and being rigid in the direction transversely of said arm so as to limit the transverse movement of said one end of said arm without impairing the longitudinal movement of said arm, thereby to cause the lower end of said plow to move in an elliptical orbital path.

14. The invention of claim 13 wherein said oscillatory member comprises an eccentric idler shaft which extends through said arm, said idler shaft being oscillated through an angle of less than 180° upon rotation of said drive shaft.

15. The invention of claim 13 wherein said oscillatory member comprises a link extending transversely of said arm, said link being pivotally mounted at one of its ends on said frame and being pivotally connected at its other end to said one end of said arm.

* * * * *